(12) United States Patent
Tosaya et al.

(10) Patent No.: US 10,431,801 B2
(45) Date of Patent: Oct. 1, 2019

(54) BUS BAR MODULE AND METHOD FOR PRODUCING BUS BAR MODULE

(71) Applicant: YAZAKI CORPORATION, Tokyo (JP)

(72) Inventors: Yuki Tosaya, Susono (JP); Hiroki Kondo, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 236 days.

(21) Appl. No.: 15/392,471

(22) Filed: Dec. 28, 2016

(65) Prior Publication Data

US 2017/0110705 A1 Apr. 20, 2017

Related U.S. Application Data

(63) Continuation of application No. PCT/JP2015/070610, filed on Jul. 17, 2015.

(30) Foreign Application Priority Data

Jul. 18, 2014 (JP) ................. 2014-147653

(51) Int. Cl.
*H01M 2/20* (2006.01)
*H01M 2/10* (2006.01)
*H01M 10/42* (2006.01)

(52) U.S. Cl.
CPC .......... *H01M 2/206* (2013.01); *H01M 2/1077* (2013.01); *H01M 10/425* (2013.01); *H01M 2220/20* (2013.01)

(58) Field of Classification Search
CPC ............................................. H01M 2/20–208
See application file for complete search history.

(56) References Cited

U.S. PATENT DOCUMENTS

2006/0246781 A1 * 11/2006 Yoon ..................... H01M 2/202
439/627
2012/0328920 A1 * 12/2012 Takase ................ H01M 2/1077
429/90

(Continued)

FOREIGN PATENT DOCUMENTS

JP 2010-114025 A 5/2010
JP 2012190678 A * 10/2012

(Continued)

OTHER PUBLICATIONS

International Preliminary Report on Patentability issued from the International Bureau in counterpart International Application No. PCT/JP2015/070610, dated Jan. 24, 2017, (PCT/IB/373).

(Continued)

*Primary Examiner* — Stephan J Essex
(74) *Attorney, Agent, or Firm* — Sughrue Mion, PLLC (57) ABSTRACT

A bus bar module includes: a plurality of linear conductors disposed in parallel at predetermined intervals; a belt-form flat conductor disposed adjacent to the linear conductors and extending in an axial direction of the linear conductors; and an insulating resin portion that integrally covers outer peripheral portions of the plurality of linear conductors and one side edge portion of the flat conductor, the one side edge portion being adjacent to the linear conductors. A tensile strength of the flat conductor and the insulating resin portion is not less than 50 N/mm².

3 Claims, 10 Drawing Sheets

(56) References Cited

U.S. PATENT DOCUMENTS

2013/0280569 A1 10/2013 Mori et al.
2014/0370343 A1 12/2014 Nomoto et al.

FOREIGN PATENT DOCUMENTS

| JP | 2014-86246 A | 5/2014 |
| WO | 2012/086793 A1 | 6/2012 |
| WO | 2015/099066 A1 | 7/2015 |
| WO | 2015/099070 A1 | 7/2015 |

OTHER PUBLICATIONS

Written Opinion, issued by International Searching Authority in corresponding International Application No. PCT/JP2015/070610, dated Aug. 18, 2015, (PCT/ISA/237).

International Search Report, issued by International Searching Authority in corresponding International Application No. PCT/JP2015/070610, dated Aug. 18, 2015, (PCT/ISA/210).

* cited by examiner

BUS BAR MODULE AND METHOD FOR PRODUCING BUS BAR MODULE

CROSS REFERENCE TO RELATED APPLICATION(S)

This application is a continuation of PCT application No. PCT/JP2015/070610, which was filed on Jul. 17, 2015 based on Japanese Patent Application (No. 2014-147653) filed on Jul. 18, 2014, the contents of which are incorporated herein by reference.

BACKGROUND OF THE INVENTION

1. Field of the Invention

The present invention relates to a bus bar module and a method for producing the bus bar module.

2. Description of the Related Art

Conventionally, a battery module has been known as a battery mounted on an electric motor car such as a hybrid car or an electric car. The battery module is formed by laminating a plurality of battery cells in the direction of the thickness thereof and placing them in a case. As the battery cells, for example, lithium-ion secondary batteries are used. This battery module is provided with a bus bar that electrically connects electrode terminals of individual battery cells and a battery detection line for detecting the voltage conditions of individual battery cells.

JP-A-2010-114025 discloses a voltage detection module device. In this device, an insulating frame is incorporated in the body of the battery pack, and in this insulating frame, a plurality of bus bars connecting the electrode terminals of the battery cells are disposed, and flat cables which are to be voltage detection lines are disposed in an area other than the bus bars. On each flat cable, a required cut is formed in each interval between the conductor lines, and the end portions of the individual conductor lines are cut off from each other. And the cut-off end portions of the conductor lines are welded to predetermined bus bars, thereby connecting the bus bars and the conductor lines of the flat cables.

SUMMARY OF THE INVENTION

According to the method disclosed in JP-A-2010-114025, although the voltage detection lines are set on the insulating frame, these are not held. For this reason, a problem occurs in that when mounted on a vehicle, the voltage detection lines come off due to vibrations of the vehicle or the like so that the voltage detection lines are broken.

The present invention is made in view of such circumstances, and an object thereof is to provide a bus bar module and a method for producing the bus bar module capable of firmly coupling the voltage detection lines and the bus bars.

Means for Solving the Problem

The present invention contains the following aspects (1)-(10).

(1) A bus bar module including: a plurality of linear conductors disposed in parallel at predetermined intervals; a belt-form flat conductor disposed adjacent to the linear conductors and extending in an axial direction of the linear conductors; and an insulating resin portion that integrally covers outer peripheral portions of the plurality of linear conductors and one side edge portion of the flat conductor, the one side edge portion being adjacent to the linear conductors, wherein a tensile strength of the flat conductor and the insulating resin portion is not less than 50 N/mm$^2$.

(2) The bus bar module according to the above (1), wherein the flat conductor has a plurality of through holes formed in the one side edge portion at predetermined intervals in the direction in which the flat conductor extends, and wherein the one side edge portion is covered with the insulating resin portion over an area including the through holes.

(3) The bus bar module according to the above (2), wherein a tensile strength of the flat conductor and the insulating resin portion at the through holes as a first reference point is not less than a tensile strength of the flat conductor and the insulating resin portion at a point closer to a side edge than the through holes as a second reference point, and wherein the tensile strength of the flat conductor and the insulating resin portion at the second reference point is higher than a tensile strength of the insulating resin portion between the flat conductor and the linear conductors.

(4) The bus bar module according to the above (2) or (3), wherein a dripping amount of the insulating resin portion through the through holes is set within a range of not less than 0.2 mm and not more than 4 mm.

(5) The bus bar module according to any one of the above (1) to (4), wherein the flat conductor has a positioning reference line formed in a direction in which the flat conductor extends.

(6) A method for producing a bus bar module including: disposing a plurality of linear conductors in parallel at predetermined intervals, and disposing a belt-form flat conductor in parallel with and adjacent to the linear conductors; and performing extrusion molding by using a resin material having a melt viscosity of not less than 20 g/10 min and not more than 2000 g/10 min to integrally cover outer peripheral portions of the plurality of linear conductors and one side edge portion of the flat conductor with the resin material, the one side edge portion being adjacent to the linear conductors.

(7) The method for producing the bus bar module according to the above (6), wherein prior to the performing extrusion molding, a plurality of through holes are formed in the one side edge portion of the flat conductor at predetermined intervals in a direction in which the flat conductor extends.

(8) The method for producing the bus bar module according to the above (6) or (7), wherein the resin material used for the extrusion molding has a melt viscosity of not less than 20 g/10 min and not more than 500 g/10 min.

(9) The method for producing the bus bar module according to any one of the above (6) to (8), wherein the performing extrusion molding includes forming a mark on the flat conductor by a mold to form a positioning reference line in the direction in which the flat conductor extends.

(10) A method for producing a bus bar module including: disposing a plurality of linear conductors in parallel at predetermined intervals, and disposing a belt-form flat conductor in parallel with and adjacent to the linear conductors; and performing press molding by using a resin material having a melt viscosity of not less than 20 g/10 min and not more than 2000 g/10 min to integrally cover outer peripheral portions of the plurality of linear conductors and one side edge portion of the flat conductor, the one side edge portion being adjacent to the linear conductors.

According to the aspects of the present invention, the voltage detection line formed being covered with the insulating resin portion and the flat conductor can be firmly coupled. Consequently, a situation can be suppressed that the voltage detection line comes off so that the voltage detection line is broken.

DETAILED DESCRIPTION OF THE EXEMPLARY EMBODIMENTS

First Embodiment

Figure 1:
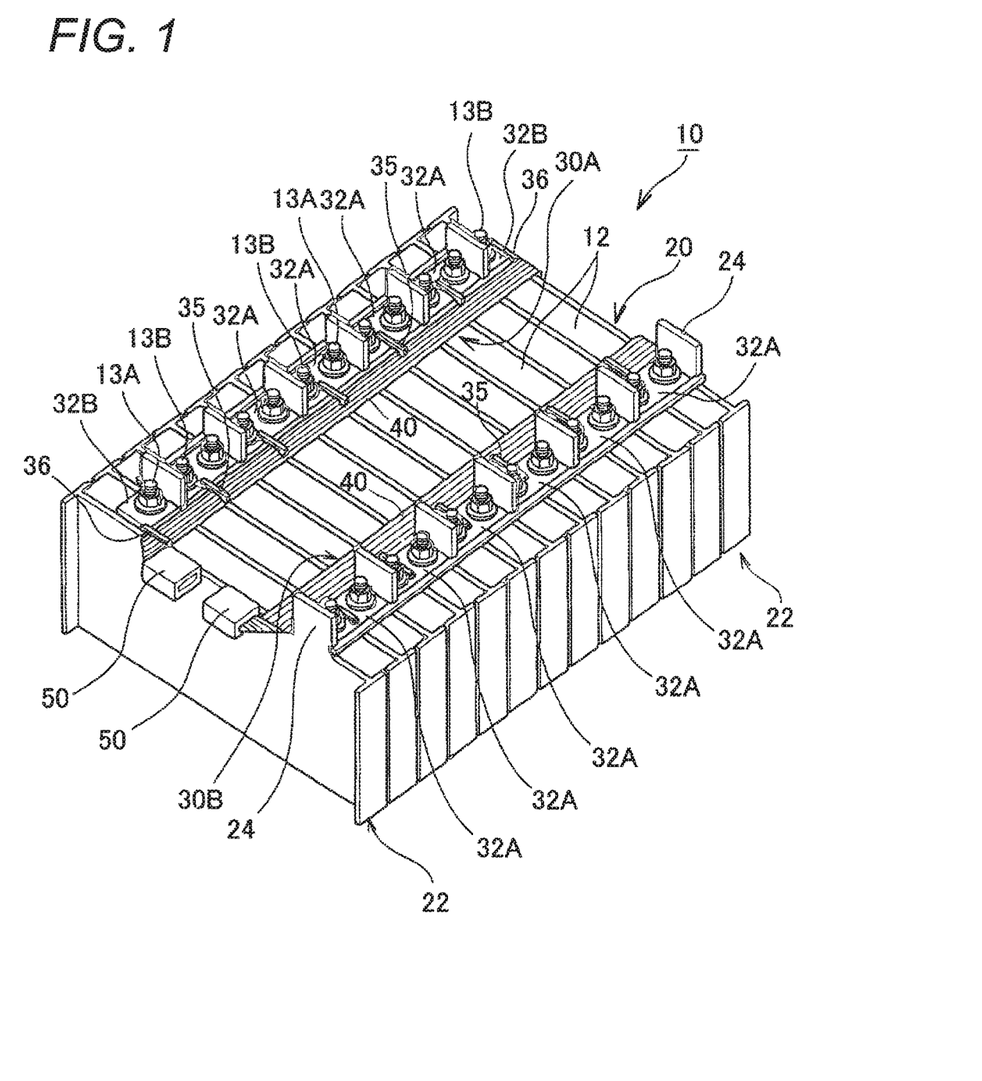
FIG. 1 is a perspective view schematically showing the structure of a battery pack to which bus bar modules according to a first embodiment of the present invention are applied.
Figure 2:
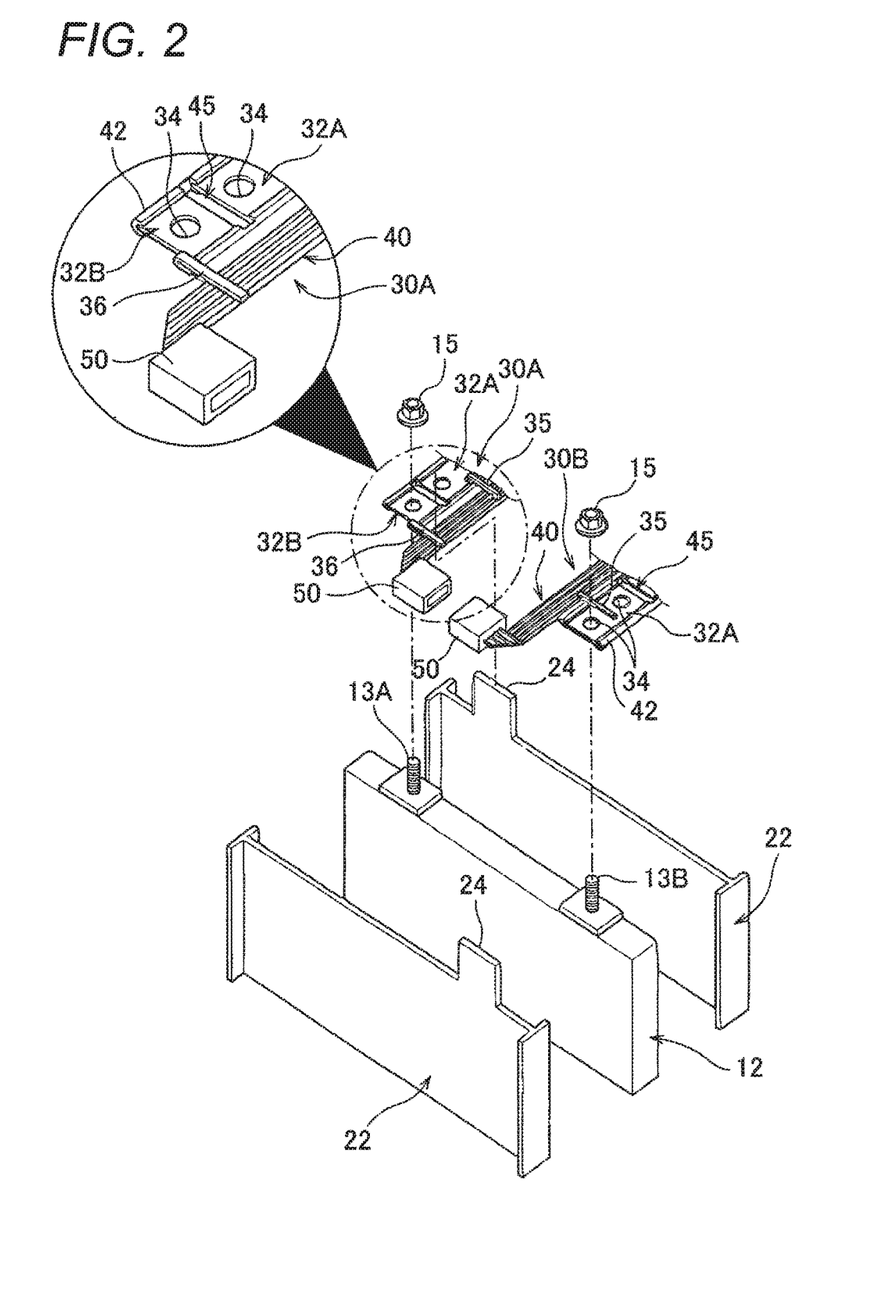
FIG. 2 is an exploded perspective view showing a relevant part of the battery pack shown in FIG. 1.
Figure 3:
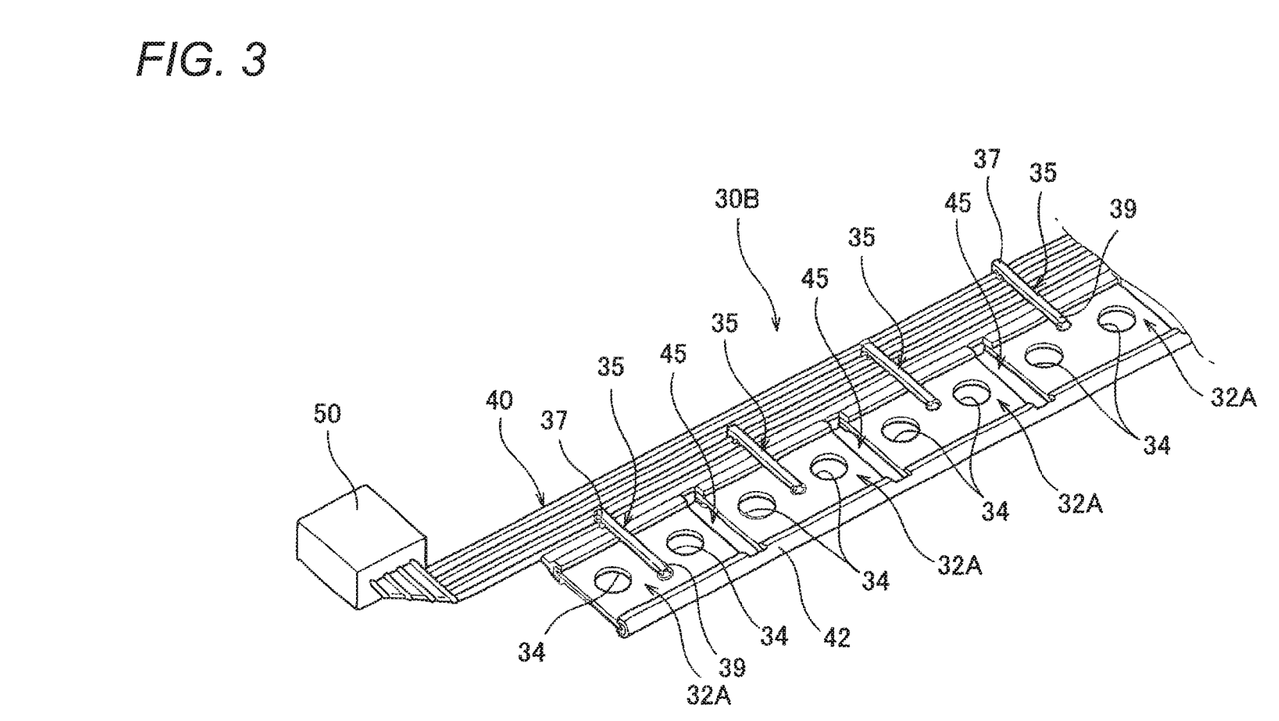
FIG. 3 is a partial perspective view of the bus bar module shown in FIG. 1.

FIG. 1 is a perspective view schematically showing the structure of a battery pack 10 to which bus bar modules 30A and 30B according to a first embodiment of the present invention are applied. FIG. 2 is an exploded perspective view showing a relevant part of the battery pack 10 shown in FIG. 1. FIG. 3 is a partial perspective view of the bus bar module 30B shown in FIG. 1. FIGS. 4A to 4D are explanatory views explaining production steps of the bus bar module 30B shown in FIG. 1.

The battery pack 10 is used as the battery of, for example, an electric car or a hybrid car, and has a battery module 20 and the bus bar modules 30A and 30B.

The battery module 20 is formed of a plurality of battery cells 12 arranged in the direction of the thickness and a plurality of separators 22 disposed so as to sandwich both sides of the battery cells 12 from the direction of the thickness. The battery module 20 is disposed in a non-illustrated box-shaped housing and fixed.

The battery cells 12 are each a secondary battery, and on the top surface of each battery cell 12, a positive terminal 13A and a negative terminal 13B are formed in a protruding manner. The plurality of battery cells 12 disposed in the housing are arranged in an alternately reversed state so that the positions of the positive terminals 13A and the negative terminals 13B are staggered between the adjacent battery cells 12. The positive terminals 13A and the negative terminals 13B are passed through bus bars 32A and 32B described later, and fastening nuts 15 are attached thereto.

The separator 22 is a plate-form member formed in a required shape by using an insulating resin. At the upper end of the separator 22, a partition portion 24 protruding from the upper surface of the battery cell 12 is formed. This partition portion 24 protrudes upward above a slit 45 formed between the adjacent bus bars 32A and 32B and suppresses a short circuit between electrodes due to a tool.

The bus bar modules 30A and 30B have an elongated shape that is horizontally long in the direction of lamination of the battery cells 12, and are disposed in two lines in parallel in positions corresponding to the positive terminals 13A and the negative terminals 13B on the plurality of battery cells 12. The bus bar modules 30A and 30B are formed of a plurality of bus bars 32A and 32B linearly arranged in the direction of lamination of the battery cells 12, voltage detection lines 40 situated on inner sides of the plurality of bus bars 32A and 32B and extending in the direction of arrangement thereof and insulating resin portions 23, respectively.

In one bus bar module 30A of the bus bar modules 30A and 30B arranged in two lines, the bus bars 32B corresponding to one hole are disposed at both end portions, and between these bus bars 32B, five bus bars 32A corresponding to two holes are arranged laterally. On the contrary, in the other bus bar module 30B, six bus bars 32A corresponding to two holes are arranged laterally. In both of the bus bar modules 30A and 30B, the individual bus bars 32A and 32B are linearly arranged in such a manner that terminal insertion holes 34 are arranged in one line.

The bus bar 32A is electrically connected to the positive terminal 13A and the negative terminal 13B. This bus bar 32A has a square shape, and is provided with two terminal insertions holes 34 for passing the positive terminal 13A and the negative terminal 13B therethrough, respectively, for connection. On the other hand, the bus bar 32B is electrically connected to the positive terminal 13A or the negative terminal 13B. The bus bar 32B has a square shape, and is provided with one terminal insertion hole 34 for passing the positive terminal 13A or the negative terminal 13B therethrough, respectively, for connection.

The bus bars 32A and 32B constituting the bus bar modules 30A and 30B are fastened to the positive terminals 13A and the negative terminals 13B inserted through the terminal insertion holes 34 by the nuts 15. Thereby, the bus bars 32A and 32B, and the positive terminals 13A and the negative terminals 13B are electrically connected. As the method for electrically connecting the bus bar terminals, a method such as welding may be used.

The bus bars 32A and 32B are formed by performing punching on an elongated belt-form flat conductor 33 made of a plate member of a metal such as copper, copper alloy, aluminum, aluminum alloy, gold or stainless steel (SUS) in a press process described later. On the bus bars 32A and 32B, plate processing of such as Sn, Ni, Ag or Au may be performed in order to improve weldability.

The voltage detection line 40 is for measuring the voltage of the battery cells 12, and formed of a plurality of linear conductors 21. This voltage detection line 40 is formed by the plurality of linear conductors 21 integrally covered with the insulating resin portion 23 into a flat cable form. To one end of the voltage detection line 40, a connector 50 is connected and fixed.

The plurality of linear conductors 21 are disposed in parallel at predetermined intervals. As the individual linear conductors 21, various conductors such as solid wires like flat conductors and round conductors, and stranded wires may be used.

The insulating resin portion 23 integrally covers outer peripheral portions of the plurality of linear conductors 21 and one side edge portion 32a of the bus bars 32A and 32B, and covers the other side edge portion 32b of the bus bars 32A and 32B. In the side edge portions on both sides in the direction of arrangement of the bus bars 32A and 32B, the one side edge portion (hereinafter, referred to as "first side edge portion") 32a corresponds to the side edge portion on the side adjacent to the linear conductors 21, and the other side edge portion (hereinafter, "second side edge portion") 32b corresponds to the side edge portion situated on the opposite side of the first side edge portion 32a.

By this insulating resin portion 23, the bus bars 32A and 32B and the voltage detection line 40 are integrated in a state of being juxtaposed at predetermined intervals. Moreover, the insulating resin portion 23 covering the second side edge portion 32b forms a coupling portion 42 continuous in the direction of arrangement of the bus bars 32A and 32B. This coupling portion 42 connects the second side edge portion 32b of the bus bars 32A and 32B to thereby suppress scattering of the bus bars 32A and 32B and suppress reduction in the force of coupling with the voltage detection line 40. It is to be noted that the coupling portion 42 may be omitted.

Figure 4A:
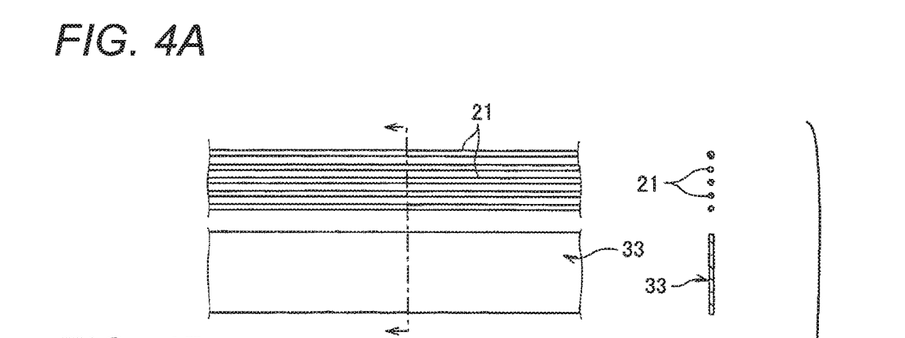
FIGS. 4A to 4D are explanatory views explaining production steps of the bus bar module shown in FIG. 1.
Figure 4B:
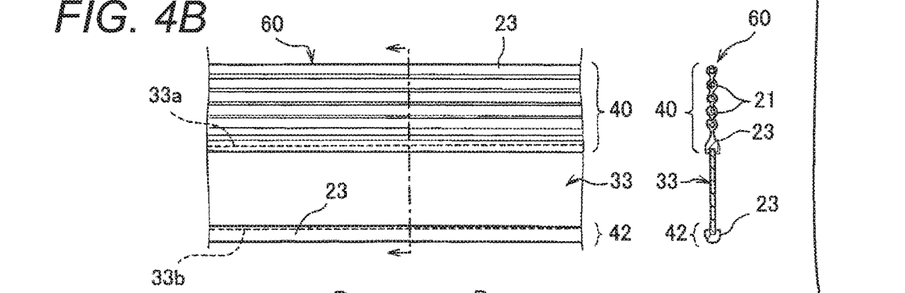
Figure 4C:
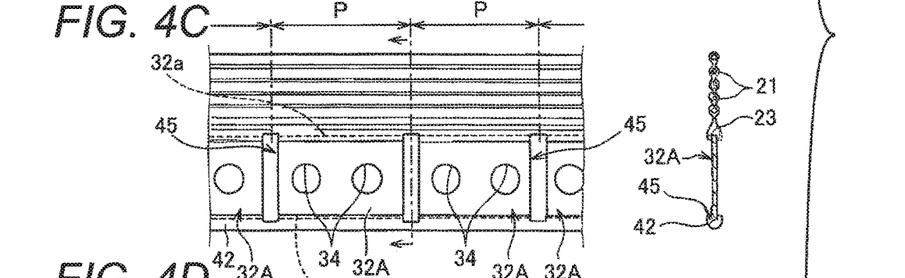
Figure 4D:
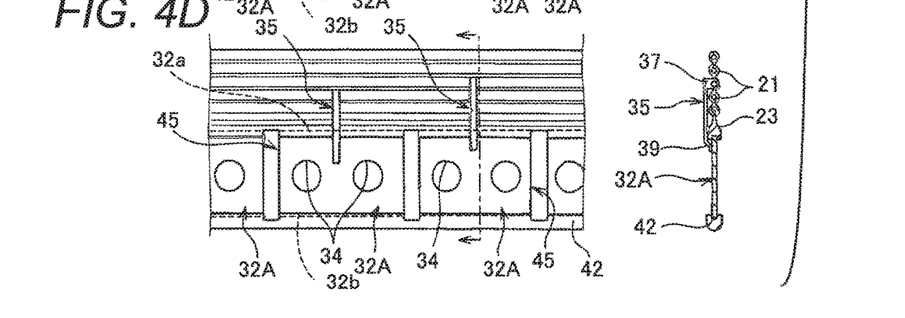

Moreover, the bus bar modules 30A and 30B are provided with connection members 35 that electrically connect the bus bars 32A and the corresponding linear conductors 21 of the voltage detection lines 40. As shown in FIG. 4D, the connection member 35 has a pressure sword portion 37 at one end of the body, and has a weld portion 39 at the other end thereof. The pressure sword portion 37 of the connection member 35 is pressure-welded to a predetermined linear conductor 21, and the weld portion 39 thereof is welded to a predetermined bus bar 32A. This connection member 35 is formed by punching a metal plate material.

On the other hand, the electric connection between the bus bars 32B and the corresponding linear conductors 21 of the voltage detection line 40 is made by raised pieces 36 formed on the bus bars 32. The raised pieces 36 are bent along the side edges of the bus bars 32B, and the tips thereof are welded to predetermined linear conductors 21.

Next, referring to FIG. 4, a method for producing the bus bar modules 30A and 30B will be described. Since the bus bar modules 30A and 30B are each produced by a similar process, a production method related to the bus bar module 30B will be described below.

First, at a first step, the plurality of linear conductors 21 are disposed in parallel at the predetermined intervals. Moreover, at a side of these linear conductors 21, the elongated belt-form flat conductor 33 extending along the axial direction of the linear conductors 21 is disposed in parallel (disposition step (see FIG. 4A)).

Then, at a second step, press molding using a predetermined resin material is performed, the outer peripheral portions of the plurality of linear conductors 21 and one side edge portion 33a of the flat conductor 33 adjacent to the linear conductors 21 are integrally covered with the insulating resin portion 23.

Moreover, in this press molding, simultaneously, the other side edge portion 33b situated on the opposite side of the one side edge portion 33a at the flat conductor 33 is also covered with the insulating resin portion 23.

By this press molding, an elongated circuit unit 60 is formed where the plurality of linear conductors 21 constituting the flat-cable-form voltage detection line 40 and the flat conductor 33 are connected by the insulating resin portion 23 and integrally disposed in parallel (molding step (see FIG. 4B)).

In the elongated circuit unit 60 applied as the bus bar module 30B, the tensile strength of the flat conductor 33 and the insulating resin portion 23 are set to not less than 50 N/mm$^2$. To secure such a tensile strength, in the molding step, a resin material having a melt viscosity (melt flow rate) of not less than 20 g/10 min and not more than 2000 g/10 min is used. This is because when the melt viscosity is lower than 20 g/10 min, the viscosity is so low that press molding cannot be performed and when the melt viscosity is higher than 2000 g/10 min, the viscosity is so high that desired performance cannot be obtained.

By this condition, at the time of press molding, the molten resin adheres to the one side edge portion 33a of the flat conductor 33 with excellent formability, and further, the one side edge portion 33a and the insulating resin portion 23 can be firmly coupled through the adhesive property of the resin material.

Here, regarding the condition related to the above-mentioned melt viscosity, the load condition and the temperature condition for resin materials are as shown below. The load condition is 21.6 kg for all. The temperature condition is 180 to 210 degrees C. for polyvinyl chloride (PVC), 230 to 250 degrees C. for polypropylene (PP), 140 to 200 degrees C. for polyethylene (PE), 280 to 330 degrees C. for polyphenylene sulfide (PPS), and 200 to 230 degrees C. for polyphenylene ether (PPE).

Next, the elongated circuit unit 60 is cut along the longitudinal direction thereof so as to have a predetermined length. The circuit unit 60 which has been cut is punched to form a plurality of slits 45 at predetermined intervals along a longitudinal direction (extending direction) of the flat conductor 33 and to form terminal insertion holes 34. Accordingly, the flat conductor 33 having a required shape after punching is formed as a plurality of the bus bars 32A (punching step (see FIG. 4C). The length of the slit 45 in the longitudinal direction is set to surely separate the adjacent bus bars 32A.

Then, the individual linear conductors 21 and the predetermined bus bars 32A are electrically connected by the connection members 35. Regarding the connection members 35, the pressure sword portion 37 formed at one end of the body is pressure-welded to the predetermined linear conductor 21, and the weld portion 39 formed at the other end of the body is welded to the predetermined bus bar 32A (connection step (see FIG. 4D)).

As described above, according to the bus bar modules 30A and 30B of the present first embodiment, the tensile strength of the flat conductor 33 corresponding to the bus bars 32A and 32B and the insulating resin portion 23 is set to not less than 50 N/mm$^2$. Thereby, the voltage detection line 40 covered with the insulating resin portion 23 and the flat conductor 33 can be firmly coupled. Consequently, a situation can be suppressed that the voltage detection line 40 comes off so that the voltage detection line 40 is broken.

Moreover, according to the bus bar modules 30A and 30B of the present first embodiment, since the plurality of bus bars 32A and 32B and the voltage detection line 40 are integrated, the routing work of the voltage detection line 40 can be eliminated. Thereby, assembly to the battery module 20 can be easily performed.

Moreover, according to the present first embodiment, since the linear conductors 21 constituting the voltage detection line 40 are covered with the insulating resin portion 23, it is unnecessary to provide a cover or a case, so that space saving and weight reduction can be realized.

Moreover, according to the method for producing the bus bar modules 30A and 30B according to the present first embodiment, press molding is performed by using a resin material having a melt viscosity of not less than 20 g/10 min and not more than 2000 g/10 min. Thereby, the molten resin adheres to the one side edge portion 33a of the flat conductor 33 with excellent formability, and further, the one side edge portion 33a and the insulating resin portion 23 can be firmly coupled through the adhesive property of the resin material. Consequently, the tensile strength of the flat conductor 33 applied to the bus bars 32A and 32B and the insulating resin portion 23 can be made not less than 50 N/mm$^2$.

While the connection between the bus bars 32A and the voltage detection line 40 is made by the connection members 35 in the above-described embodiment, the present invention is not limited thereto. The connection between the bus bars 32A and the voltage detection line 40 may be made by the voltage detection line 40 itself. Hereinafter, differences from the bus bar module 30B will be mainly described.

Figure 5A:
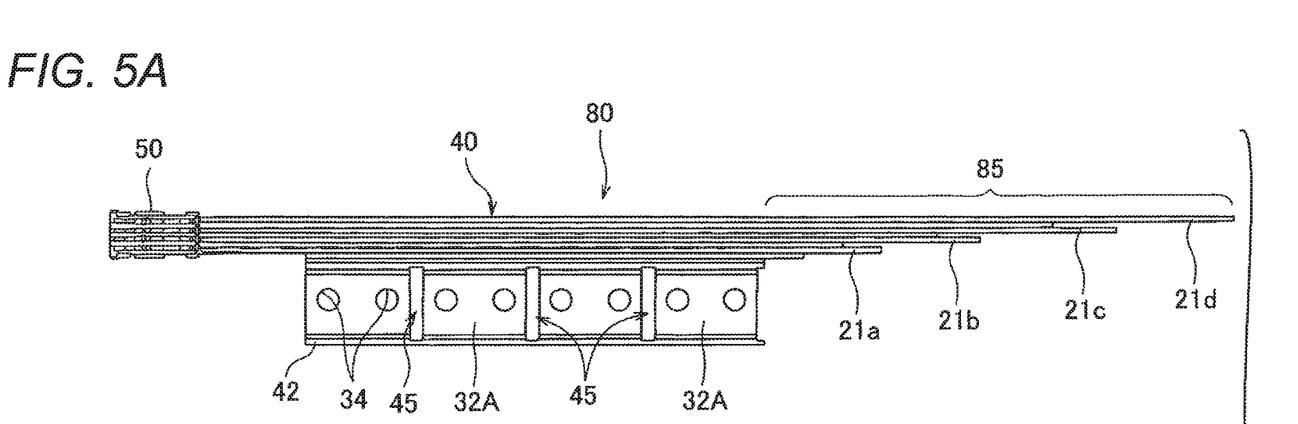
FIGS. 5A and 5B are explanatory views showing a bus bar module according to a first modification.
Figure 5B:
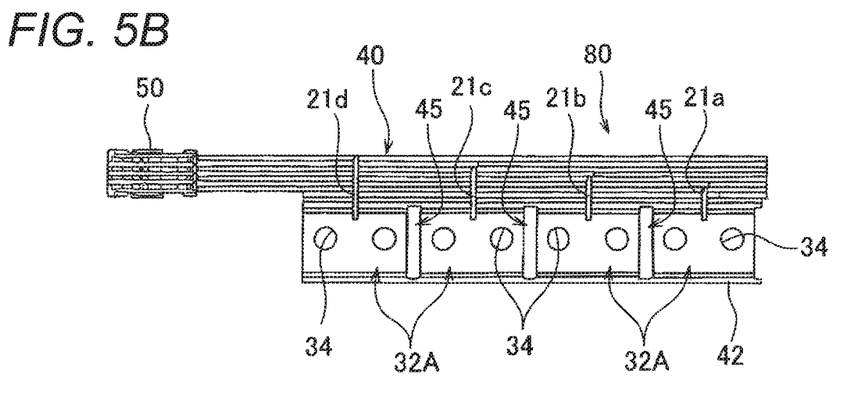

FIGS. 5A and 5B are explanatory views showing a bus bar module 80 according to a first modification. As shown in the above-described production method, when the elongated circuit unit 60 is formed, this is cut into a predetermined length. Then, in the punching step, the remaining flat conductor 33 except the four bus bars 32A on the side of the connector 50 and part of the voltage detection line 40 ranging therefrom are punched in required shapes.

In the place where the flat conductor 33 has been removed, the remaining part 85 of the voltage detection line 40 remains, and in this remaining part 85, end portions 21a to 21d of the plurality of linear conductors 21 are left. These end portions 21a to 21d are formed so that the farther from the bus bars 32A, the larger the lengths are (see FIG. 5A).

In the connection step, the remaining part 85 of the voltage detection line 40 is bent substantially at 180 degrees and placed on the voltage detection line 40. Then, the individual end portions 21a to 21d are bent substantially at a right angle toward the corresponding bus bars 32A and welded to the bus bars 32A, respectively (see FIG. 5B). Thereby, the voltage detection line 40 and the bus bars 32A are directly connected.

Figure 6A:
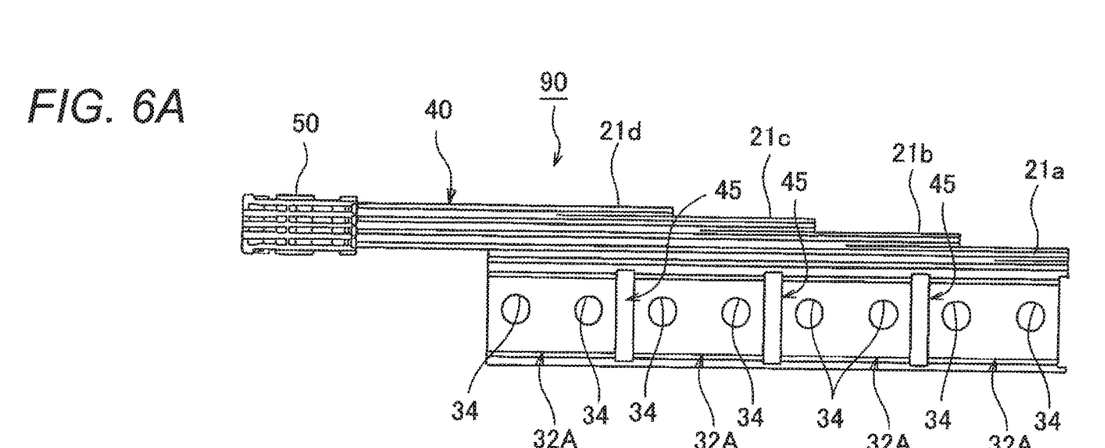
FIGS. 6A and 6B are explanatory views showing a bus bar module according to a second modification.
Figure 6B:
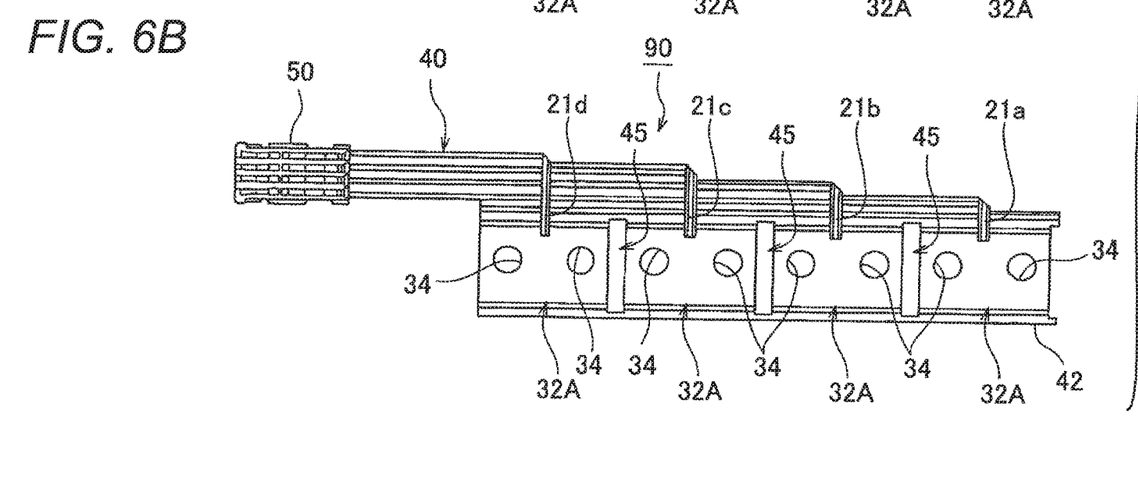

FIGS. 6A and 6B are explanatory views showing a bus bar module 90 according to a second modification. As shown in the above-described production method, when the elongated circuit unit 60 is formed, this is cut into a predetermined length. Then, in the punching step, the remaining flat conductor 33 except the four bus bars 32A on the side of the connector 50 and the voltage detection line 40 ranging therefrom are punched in required shapes.

On the voltage detection line 40 in parallel with the four bus bars 32A, the end portions 21a to 21d of the plurality of linear conductors 21 are left, and these end portions 21a to 21d are formed so that the farther from the bus bars 32A, the smaller the lengths are (see FIG. 6A).

In the connection step, the individual end portions 21a to 21d are bent substantially as a right angle toward the corresponding bus bars 32A and welded to the bus bars 32A, respectively (see FIG. 6B). Thereby, the voltage detection line 40 and the bus bars 32A are directly connected.

These modifications are also applicable to a second embodiment.

Second Embodiment

Figure 7A:
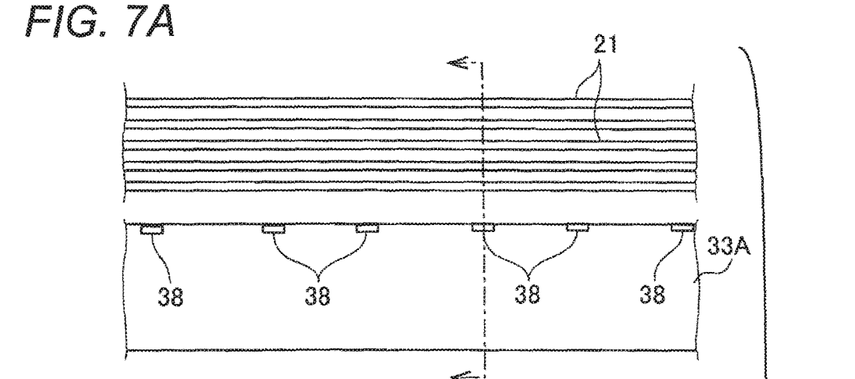
FIGS. 7A to 7C are explanatory views showing the bus bar module and its production method according to a second embodiment of the present invention.
Figure 7B:
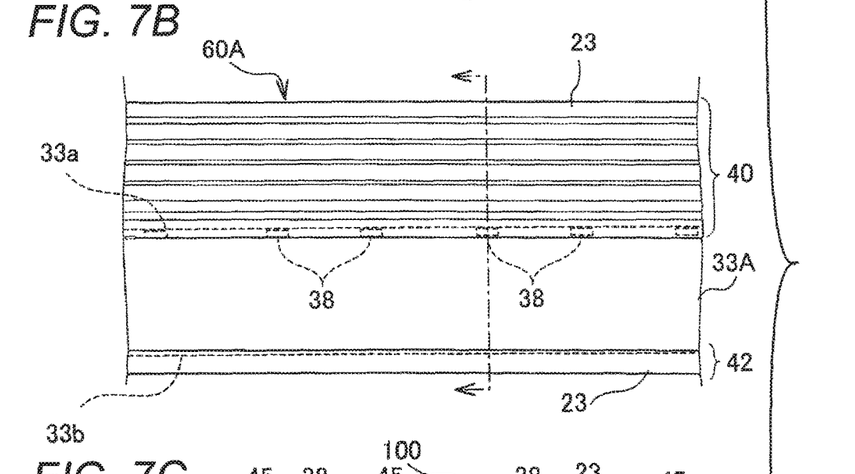
Figure 7C:
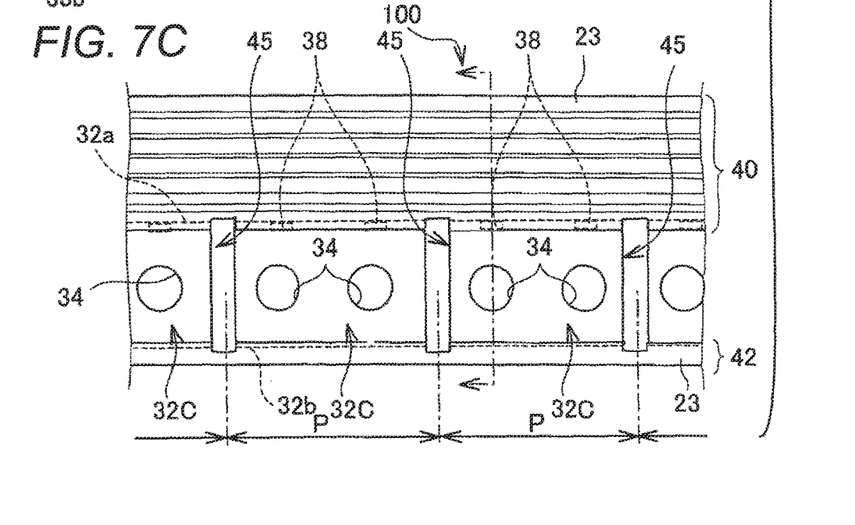

Hereinafter, a bus bar module 100 and its production method according to the second embodiment of the present invention will be described. The bus bar module 100 according to this second embodiment is different from the bus bar module 30B of the above-described first embodiment in that a flat conductor 33A provided with a plurality of through holes 38 is used. Hereinafter, descriptions overlapping with those of the first embodiment are omitted, and the difference will be mainly described.

Figure 8A:
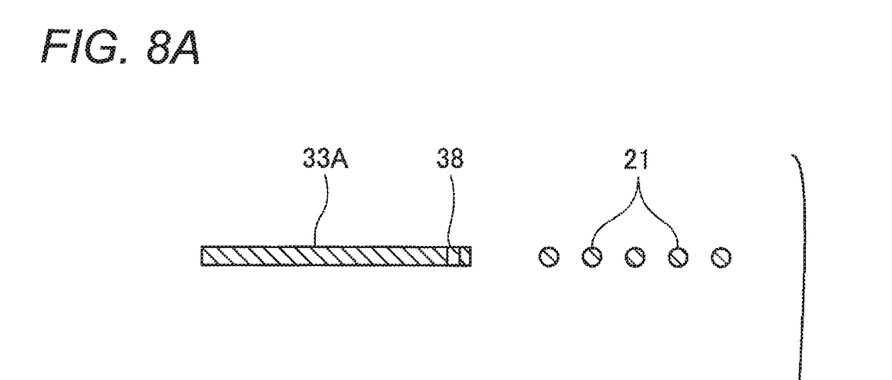
FIGS. 8A to 8C are transverse sectional views of the bus bar module shown in FIGS. 7A to 7C.
Figure 8B:
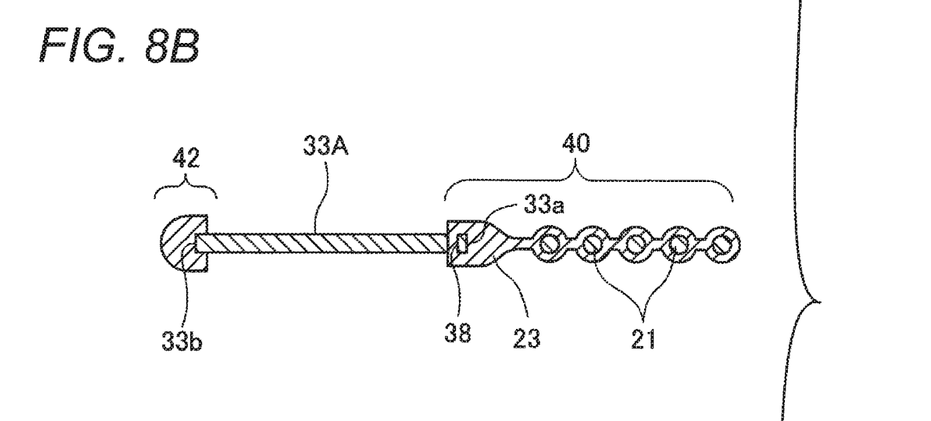
Figure 8C:
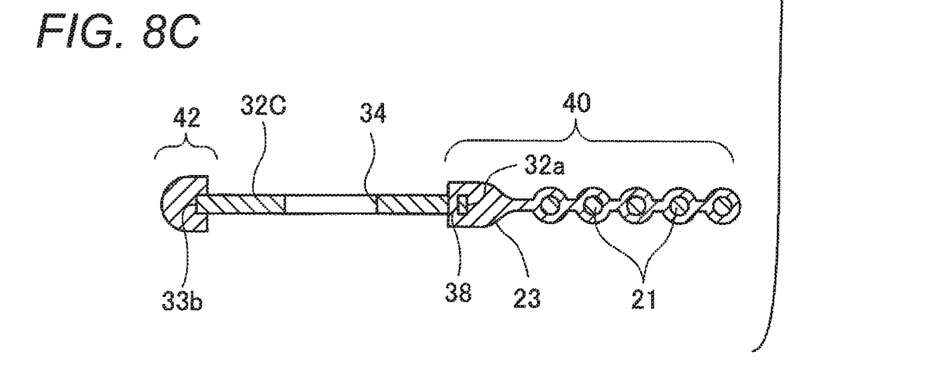

FIG. 7A to FIG. 8C are explanatory views showing the bus bar module 100 and its production method according to the second embodiment of the present invention. Here, FIGS. 7A to 7C show the bus bar module 100 and its production method with plan views, and FIGS. 8A to 8C show the bus bar module 100 and its production method shown in FIGS. 7A to 7C with transverse sectional views.

First, at a first step, the plurality of linear conductors 21 are disposed in parallel at the predetermined intervals. Moreover, at a side of these linear conductors 21, the elongated belt-form flat conductor 33A extending along the axial direction of the linear conductors 21 is disposed in parallel (disposition step (see FIG. 7A and FIG. 8A)).

As one feature of the present second embodiment, on this flat conductor 33A, the plurality of through hole 38 are formed in the one side edge portion 33a adjacent to the linear conductors 21 at predetermined intervals in the longitudinal direction. These through holes 38 are previously formed on the flat conductor 33A prior to the molding step described later.

Then, at a second step, press molding using a predetermined resin material is performed, the outer peripheral portions of the plurality of linear conductors 21 and one side edge portion 33a of the flat conductor 33A are integrally covered with the insulating resin portion 23. At this one side edge portion 33a, the area including the through holes 38 is covered with the insulating resin portion 23, and the insulating resin portion 23 also enters the through holes 38 (see FIG. 8B).

Moreover, in this press molding, simultaneously, the other side edge portion 33b situated on the opposite side of the one side edge portion 33a at the flat conductor 33A is also covered with the insulating resin portion 23.

By this press molding, an elongated circuit unit 60A is formed where the plurality of linear conductors 21 constituting the flat-cable-form voltage detection line 40 and the flat conductor 33A are connected by the insulating resin portion 23 and integrally disposed in parallel (molding step (see FIG. 7B and FIG. 8B)).

In the elongated circuit unit 60A applied as the bus bar module 100, the tensile strength of the flat conductor 33A and the insulating resin portion 23 are set to not less than 50 N/mm$^2$ as in the first embodiment. To secure such a tensile strength, in the molding step, a resin material having a melt viscosity of not less than 20 g/10 min and not more than 2000 g/10 min is used. This is because when the melt viscosity is lower than 20 g/10 min, the viscosity is so low that press molding cannot be performed and on the other hand, when the melt viscosity is higher than 2000 g/10 min, the viscosity is so high that the resin material does not enter the through holes 38.

By this condition, at the time of press molding, the molten resin adheres to the one side edge portion 33a of the flat conductor 33A with excellent formability, and further, the one side edge portion 33a and the insulating resin portion 23 can be firmly coupled through the adhesive property of the resin material. Moreover, at the press molding, since the molten resin enters the through holes 38, the one side edge portion 33a and the insulating resin portion 23 can be firmly coupled through the mechanical coupling by the through holes 38. As the resin material related to the present molding step, for example, polybutylene terephthalate may be used.

Then, the elongated circuit unit 60A is cut into a predetermined length in the longitudinal direction thereof. Then, as in the first embodiment, individual bus bars 32C are formed by the punching step (see FIG. 7C and FIG. 8C), and lastly, the connection step on the bus bars 32C is performed.

As described above, according to the bus bar module 100 of the present second embodiment, the tensile strength of the flat conductor 33 corresponding to the bus bar 32C and the insulating resin portion 23 is set to not less than 50 N/mm$^2$. Thereby, the voltage detection line 40 covered with the insulating resin portion 23 and the flat conductor 33 can be firmly coupled. Consequently, a situation can be suppressed that the voltage detection line 40 comes off so that the voltage detection line 40 is broken.

Moreover, according to the method for producing the bus bar module 100 according to the present second embodiment, press molding is performed by using a resin material having a melt viscosity of not less than 20 g/10 min and not more than 2000 g/10 min. Thereby, the molten resin adheres to the one side edge portion 33a of the flat conductor 33A with excellent formability, and further, the one side edge portion 33a and the insulating resin portion 23 can be firmly coupled through the adhesive property of the resin material. Moreover, the plurality of through holes 38 are formed on the flat conductor 33A and the molten resin enters the through holes 38, so that the one side edge portion 33a and the insulating resin portion 23 can be firmly coupled through the mechanical coupling by the through holes 38. Consequently, the tensile strength of the flat conductor 33 and the insulating resin portion 23 applied to the bus bars 32C can be made not less than 50 N/mm$^2$.

Third Embodiment

Figure 9A:
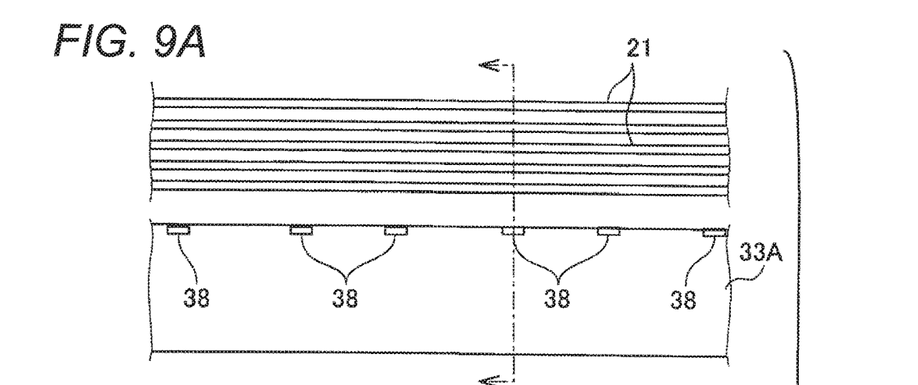
FIGS. 9A to 9C are explanatory views showing a bus bar module and its production method according to a third embodiment of the present invention.
Figure 9B:
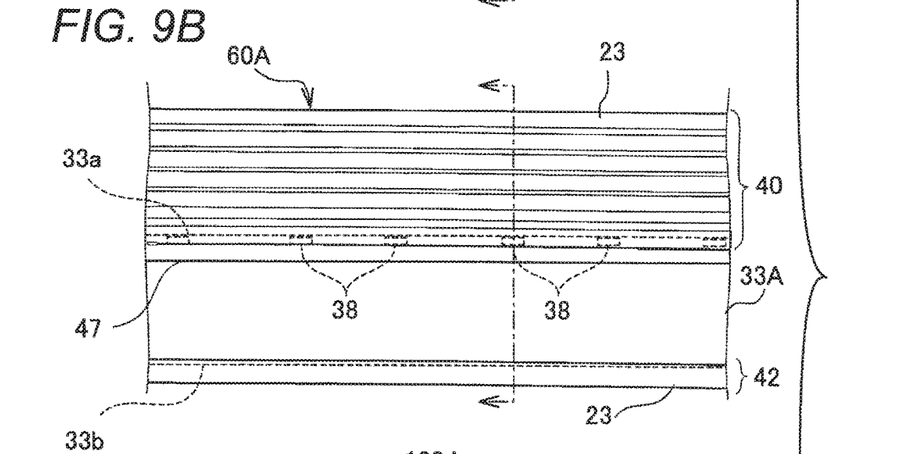
Figure 9C:
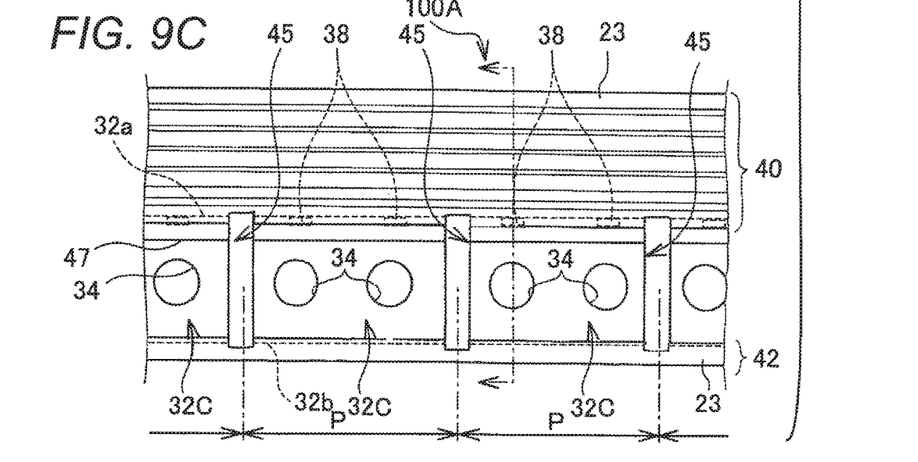

Hereinafter, a bus bar module 100A and its production method according to a third embodiment of the present invention will be described. The bus bar module 100A according to this third embodiment is different from the bus bar module 30B of the first embodiment in that the plurality of through holes 38 are provided on the flat conductor 33A. Hereinafter, descriptions overlapping with those of the first embodiment are omitted, and the difference will be mainly described.

FIGS. 9A to 9C are explanatory views showing the bus bar module 100A and its production method according to the third embodiment of the present invention. Here, FIGS. 9A to 9C show the bus bar module 100A and its production method with plan views.

First, at a first step, the plurality of linear conductors 21 are disposed in parallel at the predetermined intervals. Moreover, at a side of these linear conductors 21, the elongated belt-form flat conductor 33A extending along the axial direction of the linear conductors 21 is disposed in parallel (disposition step (see FIG. 9A)). On this flat conductor 33A, as in the second embodiment, the plurality of through holes 38 are formed in the one side edge portion 33a adjacent to the linear conductors 21 at the predetermined intervals in the longitudinal direction. These through holes 38 are previously formed on the flat conductor 33A prior to the molding step described later.

Then, at a second step, extrusion molding using a predetermined resin material is performed, and the outer peripheral portions of the plurality of linear conductors 21 and the one side edge portion 33a of the flat conductor 33A are integrally covered with the insulating resin portion 23. At this one side edge portion 33a, the area including the through holes 38 is covered with the insulating resin portion 23, and the insulating resin portion 23 also enters the through holes 38 (see FIG. 9B).

Moreover, in this extrusion molding, simultaneously, the other side edge portion 33b situated on the opposite side of the one side edge portion 33a at the flat conductor 33A is also covered with the insulating resin portion 23.

Further, at the time of extrusion molding, a mark is linearly formed on the flat conductor 33 by the mold (not shown). That is, by the mechanical action at the time of extrusion molding, a positioning reference line 47 extending in the longitudinal direction of the flat conductor 33A is formed. This positioning reference line 47 can be used as the reference line for determining the punching positions of the slits 45 in the punching step.

In the elongated circuit unit 60A applied as the bus bar module 100A, the tensile strength of the flat conductor 33A and the insulating resin portion 23 are set to not less than 50 N/mm$^2$ as in the first embodiment. To secure such a tensile strength, in the molding step, a resin material having a melt viscosity of not less than 20 g/10 min and not more than 2000 g/10 min is used. This is because when the melt viscosity is lower than 20 g/10 min, the viscosity is so low that extrusion molding cannot be performed and on the other hand, when the melt viscosity is higher than 2000 g/10 min, the viscosity is so high that the resin material does not enter the through holes 38.

By this condition, at the time of extrusion molding, the molten resin adheres to the one side edge portion 33a of the flat conductor 33A with excellent formability, and further, the one side edge portion 33a and the insulating resin portion 23 can be firmly coupled through the adhesive property of the resin material. Moreover, at the extrusion molding, since the molten resin also enters the through holes 38, the one side edge portion 33a and the insulating resin portion 23 can be firmly coupled through the mechanical coupling by the through holes 38. As the resin material related to the present molding step, for example, polybutylene terephthalate may be used.

Figure 10:
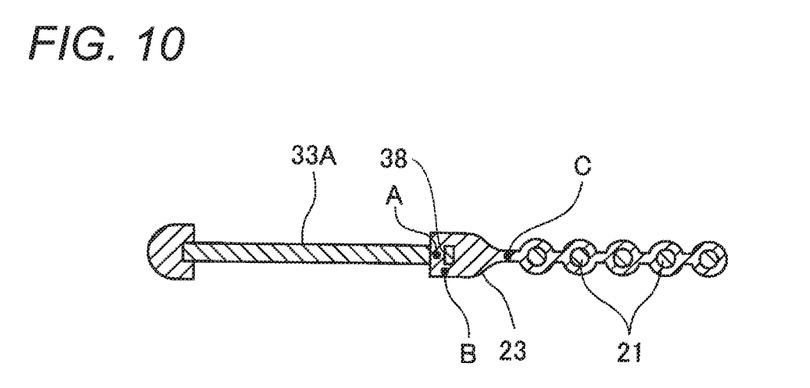
FIG. 10 is an explanatory view showing a relationship of a tensile strength.

Particularly in the present third embodiment, tensile strengths Fa to Fc at points indicated by reference designations A to C in FIG. 10 are set to a relationship where the tensile strength Fa is not less than the tensile strength Fb (Fa≥Fb) and a relationship where the tensile strength Fb is higher than the tensile strength Fc (Fb>Fc). Here, the tensile strength Fa at the point A is the tensile strength of the flat conductor 33A and the insulating resin portion 23 at the through holes 38 as a first reference point, and the tensile strength Fb at the point B is the tensile strength of the flat conductor 33A and the insulating resin portion 23 at a point closer to the side edge than the through holes 38 as a second reference point. Moreover, the tensile strength Fc at the point C is the tensile strength with the insulating resin portion 23 between the flat conductor 33A and the linear conductors 21.

Regarding such a condition, the melt viscosity of the resin material affects the relationship, and it is preferable that the melt viscosity of the resin material is not less than 20 g/10 min and not more than 2000 g/10 min as mentioned above.

Figure 11:
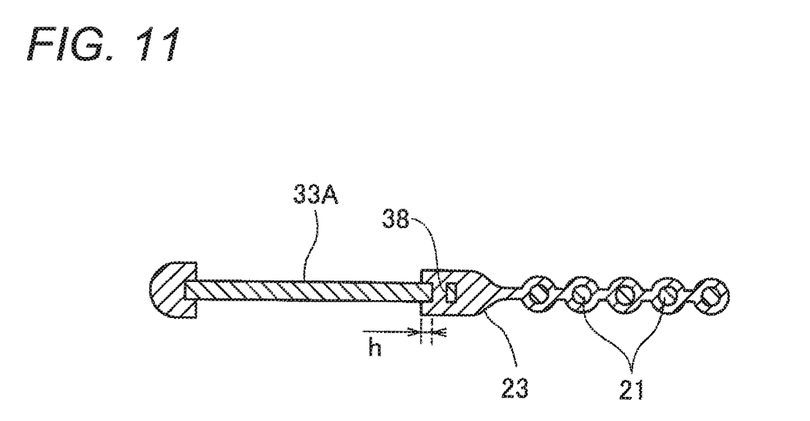
FIG. 11 is an explanatory view showing a dripping amount of an insulating resin portion from through holes.

Moreover, as shown in FIG. 11, in the extrusion molding, a phenomenon occurs that the resin drips toward the inside in the direction of the width of the flat conductor 33A through the through holes 38 (the left side in FIG. 11), and the dripping amount h is set within the range of not less than 0.2 mm and not more than 4 mm. When the dripping amount h is less than 0.2 mm, it is concerned that variations in the holding power for the side edge portion 33a of the flat conductor 33A increase. On the other hand, when the dripping amount h is larger than 0.4 mm, interference with the positive terminals 13A inserted through the terminal insertion holes 34 or the nuts 15 attached to the negative terminals 13B is a concern.

Regarding such a condition, the melt viscosity of the resin material affects the relationship, and in particular, it is preferable that the melt viscosity of the resin material is not less than 20 g/10 min and not more than 500 g/10 min.

By such a molding step, the elongated circuit unit 60A is formed where the plurality of linear conductors 21 constituting the flat-cable-form voltage detection line 40 and the flat conductor 33A are connected by the insulating resin portion 23 and integrally disposed in parallel (molding step (see FIG. 9B)).

Then, the elongated circuit unit 60A is cut into a predetermined length in the longitudinal direction thereof. Then, as in the first embodiment, the individual bus bars 32C are formed by the punching step (see FIG. 9C), and lastly, the connection step on the bus bars 32C is performed.

As described above, according to the bus bar module 100A of the present third embodiment, the tensile strength of the flat conductor 33A corresponding to the bus bar 32C and the insulating resin portion 23 is set to not less than 50 N/mm². Thereby, the voltage detection line 40 formed being covered with the insulating resin portion 23, and the flat conductor 33 can be firmly coupled. Consequently, a situation can be suppressed that the voltage detection line 40 comes off so that the voltage detection line 40 is broken.

Moreover, according to the method for producing the bus bar module 100A according to the present third embodiment, extrusion molding is performed by using a resin material with a melt viscosity of not less than 20 g/10 min and not more than 2000 g/10 min. Thereby, the molten resin adheres to the one side edge portion 33a of the flat conductor 33A with excellent formability, and further, the one side edge portion 33a and the insulating resin portion 23 can be firmly coupled through the adhesive property of the resin material. Moreover, the plurality of through holes 38 are formed on the flat conductor 33A and the molten resin enters the through holes 38, so that the one side edge portion 33a and the insulating resin portion 23 can be firmly coupled through the mechanical coupling by the through holes 38. Consequently, the tensile strength of the flat conductor 33 applied to the bus bars 23C and the insulating resin portion 23 can be made not less than 50 N/mm².

While the bus bar modules according to the embodiments of the present invention and their production methods are described above, the present invention is not limited to the above-described embodiments and various modifications are possible within the scope of the invention.

Now, the features of the embodiments of the bus bar modules and their production methods according to the above-described embodiments of the present invention will be briefly summarized and listed in the following [1] to [10]:

[1] A bus bar module (30A, 30B, 100, 100A) including:
a plurality of linear conductors (21) disposed in parallel at predetermined intervals;
a belt-form flat conductor (33, 33A) disposed adjacent to the linear conductors (21) and extending in an axial direction of the linear conductors (21); and
an insulating resin portion (23) that integrally covers outer peripheral portions of the plurality of linear conductors (21) and one side edge portion (33a) of the flat conductor (33, 33A), the one side edge portion (33a) being adjacent to the linear conductors (21),
wherein a tensile strength of the flat conductor (33, 33A) and the insulating resin portion (23) is not less than 50 N/mm².

[2] The bus bar module (100, 100A) according to the above [1],
wherein the flat conductor (33A) has a plurality of through holes (38) formed in the one side edge portion (33a) at predetermined intervals along the axial direction of the linear conductors (21), and
wherein the one side edge portion (33a) is covered with the insulating resin portion (23) over an area including the through holes (38).

[3] The bus bar module (100A) according to the above [2],
wherein a tensile strength (Fa) of the flat conductor (33A) and the insulating resin portion (23) at the through holes (38) as a first reference point (A) is not less than a tensile strength (Fb) of the flat conductor (33A) and the insulating resin portion (23) at a point closer to a side edge than the through holes (38) as a second reference pointB, and
wherein the tensile strength (Fb) of the flat conductor (33A) and the insulating resin portion (23) at the second reference point B is higher than a tensile strength (Fc) of the insulating resin portion (23) between the flat conductor (33A) and the linear conductors (21).

[4] The bus bar module (100A) according to the above [2] or [3],
wherein a dripping amount (h) of the insulating resin portion (23) through the through holes (38) is set within a range of not less than 0.2 mm and not more than 4 mm.

[5] The bus bar module (100A) according to any one of the above [1] to [4],
wherein the flat conductor (33A) has a positioning reference line (47) formed in a direction in which the flat conductor (33A) extends.

[6] A method for producing a bus bar module (100A) including:
disposing a plurality of linear conductors (21) in parallel at predetermined intervals, and disposing a belt-form flat conductor (33A) in parallel with and adjacent to the linear conductors (21); and
performing extrusion molding by using a resin material having a melt viscosity of not less than 20 g/10 min and not more than 2000 g/10 min to integrally cover outer peripheral portions of the plurality of linear conductors (21) and one side edge portion (33a) of the flat conductor (33A) with the resin material, the one side edge portion (33a) being adjacent to the linear conductors (21).

[7] The method for producing the bus bar module (100A) according to the above [6],
wherein prior to the performing extrusion molding, a plurality of through holes (38) are formed in the one side edge portion (33a) of the flat conductor (33A) at predetermined intervals in a direction in which the flat conductor (33A) extends.

[8] The method for producing the bus bar module (100A) according to the above [6] or [7],
wherein the resin material used for the extrusion molding has a melt viscosity of not less than 20 g/10 min and not more than 500 g/10 min.

[9] The method for producing the bus bar module (100A) according to any one of the above [6] to [8],
wherein the performing extrusion molding includes forming a mark is formed on the flat conductor (33A) by a mold to form a positioning reference line (47) in the direction in which the flat conductor (33A) extends.

[10] A method for producing a bus bar module (30B) including:

disposing a plurality of linear conductors (21) in parallel at predetermined intervals, and disposing a belt-form flat conductor (33) in parallel with and adjacent to the linear conductors (21); and performing press molding by using a resin material having a melt viscosity of not less than 20 g/10 min and not more than 2000 g/10 min to integrally cover outer peripheral portions of the plurality of linear conductors (21) and one side edge portion (33a) of the flat conductor (33) with the resin material, the one side edge portion (33a) being adjacent to the linear conductors (21).

According to the bus bar module and its production method of the embodiments of the present invention, since the voltage detection line formed being covered with the insulating resin portion and the flat conductor can be firmly coupled, an excellent bus bar module can be provided in which a situation does not occur that the voltage detection line comes off so that the voltage detection line is broken.

What is claimed is:

1. A bus bar module comprising:
    a plurality of linear conductors disposed in parallel at predetermined intervals;
    a belt-form flat conductor disposed adjacent to the linear conductors and extending in an axial direction of the linear conductors; and
    an insulating resin portion that integrally covers outer peripheral portions of the plurality of linear conductors and one side edge portion of the flat conductor, the one side edge portion being adjacent to the linear conductors,
    wherein a tensile strength of the flat conductor and the insulating resin portion is not less than 50 N/mm$^2$,
    wherein the flat conductor has a plurality of through holes formed in the one side edge portion at predetermined intervals along the axial direction of the linear conductors,
    wherein the one side edge portion is covered with the insulating resin portion over an area comprising the through holes, and
    wherein a dripping amount of the insulating resin portion through the through holes is set within a range of not less than 0.2 mm and not more than 4 mm.

2. The bus bar module according to claim 1,
    wherein a tensile strength of the flat conductor and the insulating resin portion at the through holes as a first reference point is not less than a tensile strength of the flat conductor and the insulating resin portion at a point closer to a side edge than the through holes as a second reference point, and
    wherein the tensile strength of the flat conductor and the insulating resin portion at the second reference point is higher than a tensile strength of the insulating resin portion between the flat conductor and the linear conductors.

3. The bus bar module according to claim 1,
    wherein the flat conductor has a positioning reference line formed in a direction in which the flat conductor extends.

* * * * *